Jan. 3, 1928.　　　　　　　　　　　　　　　　1,654,953
J. F. WAIT
REPLACING MEMBERS IN CONTAINERS
Filed Jan. 17, 1925

Justin F. Wait, INVENTOR

BY

Chas. W. Mortimer, ATTORNEY

Patented Jan. 3, 1928.

1,654,953

UNITED STATES PATENT OFFICE.

JUSTIN F. WAIT, OF NEW YORK, N. Y., ASSIGNOR TO NATIONAL ANILINE & CHEMICAL CO., INC., A CORPORATION OF NEW YORK.

REPLACING MEMBERS IN CONTAINERS.

Application filed January 17, 1925. Serial No. 3,203.

This invention relates to provision for so equipping a metallic container that apparatus can be inserted therein and withdrawn very readily and at the same time the opening through which the apparatus is withdrawn can be closed with an air tight joint without danger of permitting the same to leak inadvertently. It relates more particularly to constructing a metal container such as a still so as to have a protrusion, protuberance or extension through which a pipe may extend and to which the pipe can be permanently connected as by welding, and at the same time the protuberance has sufficient area to permit withdrawing therethrough a group or coil of pipes to which the pipe welded to the protuberance is connected.

Devices of this character have heretofore been so arranged that a gasket was required at the place where the pipe entered the container which gasket was apt to leak or need replacement. By the present invention all gaskets that would be apt to give excessive trouble are dispensed with and an airtight joint is made, while at the same time an opening may be made and closed in a satisfactory manner.

Figure 1:
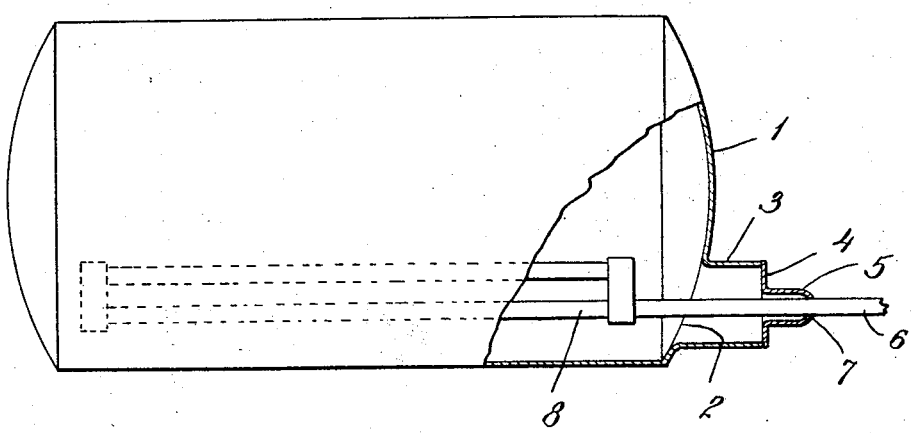
Figure 2:
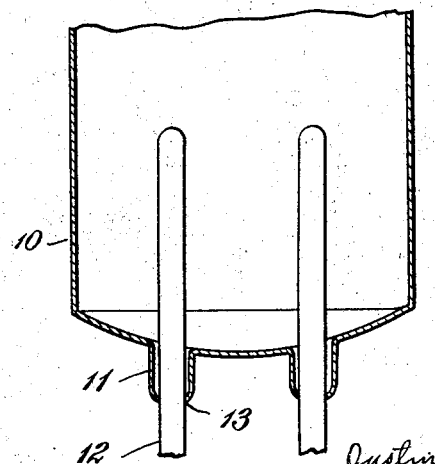

The invention will be understood in connection with the description and the accompanying drawings in which Fig. 1 is a sectional view partly broken away showing the wall of a container; and Fig. 2 is a similar view showing a modification of the invention.

In the drawings reference character 1 indicates the side of a metal container that is provided with an opening 2 of sufficient size to permit the insertion therethrough of the desired member such as a coil or pipe or a group of pipes, etc. A protrusion, protuberance or extension 3 projects from the wall of the container 1. This protrusion 3 as well as the opening 2 should be shaped in accordance with the shape of the member or other apparatus that is to be passed therethrough. It may be of rectangular or circular or any other desired shape. This protrusion 3 is provided with a cover plate 4 which may be welded thereto or made integral therewith. A second protuberance 5 extends outwardly from the plate 4 with its sides preferably parallel to the sides of the protrusion 3. It may be of the same shape or it may differ in shape from the protrusion 3. A pipe 6 may extend through the protuberance 5 and be welded thereto as shown at 7. This pipe may extend to a group of coils 8 from which another pipe may extend and pass out through another portion of the container, either similar to the way just described for the entrance pipe 6 or in any other convenient way. This sort of construction is often desired, for example, where the coil 8 is to be used as a heating coil for a still or the like, the heating medium being introduced through this and being discharged by the other pipe.

In the modification shown in Fig. 2, the container 10 is provided with a plurality of protrusions 11 through which members such as heating fingers 12, for example, may extend and to which they may be welded as shown at 13.

During the normal operation of a container used as a reaction vessel or still, it is frequently necessary to inspect, repair or even replace members inserted therein, as for example, heating coils. This is of considerable importance where corrosive liquids are used and where the coil is made up of a number of parts including welded joints which have been found to be more easily corroded than the other portions of the coils and consequently need more frequent repairing. When the inspection or repair is to be made, the protrusion 3 is cut, as for example, by means of an acetylene cutting torch so that the outer portion containing plate 4 may be removed from the stub of the still connected with the container 1. The coil 8 is then withdrawn through the opening 2 and inspection, repairs or replacement made. The surfaces of the severed member and the corresponding surface of the stub of the protrusion are then dressed as by means of a pneumatic chisel so that when the coil is reinstalled and the protrusion realigned, a firm weld may be made thus reconnecting the parts of the protrusion and thus completing the reinstallation of the member. If the pipe connection 6 is to be removed from the cover plate 4, the protrusion 5 is cut in a somewhat similar manner and the new member inserted and welded in place.

A number of removals and replacements may be made with the same protrusion by cutting over the same circumferential element but it is usually more desirable to sever the protrusion at different points so that fresh metallic surface is available for rewelding. The location of this element along which the welding joint is made should preferably be at an appreciable distance from the container surface 1 thus preventing the intersection of the protrusion 3 with the surface 1 from becoming excessively heated, it being preferable that all of the heating and other stresses occurring in the replacement should take place within the protrusion 3 and none in the container 1.

After an appreciable number of replacements have been made it may be desirable to discard portions of the protrusion 3 and to replace them by means of fresh metal of the original shape which is then welded close to the container 1, subsequent severing being done at a more remote distance therefrom.

One of the objects of cutting and rewelding the protrusion 3 at a distance remote from the container 1 is to prevent the surfaces of the container close to the protrusion connection from becoming heated to a high temperature such that on cooling they will develop high internal stresses or possibly cause rupture of the metal. By heating parts which are free to expand, to a welding temperature, the development of stresses at dangerous places is decreased or overcome and a firm weld can be made.

This method of welding and replacing heating coils and other members in a container such as a reaction vessel or still is of great value in retaining materials which may be poisonous or inflammable or which would endanger lives or property if they were allowed to leak from the vessel. It further prevents mechanical losses by leakage thus effecting a saving in the yield, and at the same time repair of necessary parts is made possible. It has been found that with a method of installing and replacing members such as has been described, the original installation cost and the cost of replacement is approximately the same as that of a gasketed type of construction.

I claim:

1. In an apparatus of the class described, a metallic container, a metallic member extending into said container, a protrusion on said container through which said member extends, said protrusion extending a sufficient distance to enable the same to be conveniently severed and welded without heating said container to a welding temperature.

2. In an apparatus of the class described, a metallic container, a metallic member extending into said container, a protrusion on said container through which said member extends, said protrusion extending outwardly a sufficient distance to enable it to be cut and welded without causing an appreciable expansion and contraction of said container.

3. In an apparatus of the class described, a metallic container, a metallic member extending into said container, a protrusion on said container through which said member extends, said protrusion comprising a plurality of portions having walls substantially parallel to said member and a portion substantially perpendicular to said member, said protrusion extending a sufficient distance to enable the same to be conveniently severed and welded without heating said container to a welding temperature.

4. In an apparatus of the class described, a metallic container, a metallic member extending into said container, a protrusion on said container, a protrusion on said first named protrusion through which said member extends, and means for making an air-tight connection between said member and said protrusion, said means including a welded joint.

5. In an apparatus of the class described, a metallic container, a group of pipes in said container, a protrusion on said container of sufficient size to enable said group of pipes to pass therethrough, a cover plate for said protrusion, a protrusion on said cover plate through which a pipe extends and connects with said group of pipes, and an air-tight welded connection between said container and pipe.

6. In an apparatus of the class described, a metallic container, a group of pipes in said container, a protrusion on said container of sufficient size to enable said group of pipes to pass therethrough, a cover plate for said protrusion, a protrusion on said cover plate through which a pipe extends, the latter being connected with said group of pipes, the walls of said protrusions being substantially parallel to the walls of said last named pipe, and an air-tight welded connection between said container and pipe.

7. In an apparatus of the class described, a metallic container, a group of pipes in said container, a protrusion on said container of sufficient size to enable said group of pipes to pass therethrough, a cover plate for said protrusion, a protrusion on said cover plate through which a pipe extends, the latter being connected with said group of pipes, the walls of said protrusions being substantially perpendicular to the adjacent wall of said container, and an air-tight welded connection between said container and pipe.

In testimony whereof I affix my signature.

JUSTIN F. WAIT.